United States Patent [19]

Roberts et al.

[11] 4,183,085

[45] Jan. 8, 1980

[54] PROTECTION OF DATA PROCESSING SYSTEM AGAINST UNAUTHORIZED PROGRAMS

[75] Inventors: David J. Roberts, Eastleigh; John Simmons, Chandlers Ford, both of England

[73] Assignee: International Business Machines Corporation, Armonk, N.Y.

[21] Appl. No.: 844,341

[22] Filed: Oct. 21, 1977

[30] Foreign Application Priority Data

Nov. 18, 1976 [GB] United Kingdom ............ 48195/76

[51] Int. Cl.$^2$ .......................... G06K 5/00; G06K 7/00
[52] U.S. Cl. .................................................. 364/200
[58] Field of Search ... 364/200 MS File, 900 MS File; 340/149 A; 235/379

[56] References Cited

U.S. PATENT DOCUMENTS

| | | | |
|---|---|---|---|
| 3,585,606 | 6/1971 | Evans | 445/2 |
| 3,764,742 | 10/1973 | Abbott et al. | 364/200 |
| 3,916,385 | 10/1975 | Parmar et al. | 445/2 |
| 3,931,504 | 1/1976 | Jacoby | 364/200 |
| 3,941,977 | 3/1976 | Voss et al. | 340/149 A |
| 3,943,335 | 3/1976 | Kinker et al. | 235/379 |
| 4,109,238 | 8/1978 | Creekmore | 235/379 |

Primary Examiner—Gareth D. Shaw
Assistant Examiner—C. T. Bartz
Attorney, Agent, or Firm—Bernard M. Goldman

[57] ABSTRACT

A data processing system is described which issues value documents e.g. tickets or information under the control of output instructions and is designed to prevent a person attempting fraud using an unauthorized program obtaining the value documents or information. The system includes a data processor controlling output units which can issue value documents or information and data storage. The data storage is divided into a secure store containing the output instructions arranged to make tampering difficult and a free storage into which an operator may load a program. Security logic is provided to check that an output instruction has originated in the secure store and to prevent operation of an output unit which receives output instructions from free storage. This makes it difficult for a person attempting fraud to produce value documents or information by loading a program into free storage.

The secure storage is preferably a read only store programmed during manufacture. When secure and free storage share a common memory bus, the security logic monitors addresses used to fetch instructions.

6 Claims, 5 Drawing Figures

PROTECTION OF DATA PROCESSING SYSTEM AGAINST UNAUTHORIZED PROGRAMS

THE INVENTION

The present invention relates to data processing systems which may issue documents of monetary value or information of a restricted nature and is concerned with the protection of the system against the use of unauthorized programs for fraudulent purposes.

Many such systems are known in the prior art, for example, a cash issuing terminal. In one such system a bank customer holds an identification card encoded with his account number and is told his secret number. The customer inserts his identification card in a terminal and if the card is valid, a keyboard area becomes accessible to the customer who then keys in his secret number and the amount of cash required. The system checks that the secret number is associated with the correct account number and that the amount requested is allowable, debits the account and issues the cash requested. Failure to meet these conditions results in the display of an appropriate message at the terminal. Lost or stolen cards when fraudulently used are retained in the terminal. It is thus difficult for a terminal user to obtain cash fraudulently.

Another such system is described in UK Pat. No. 1,437,883 entitled "Ticketing System". In this system, each operator uses a terminal for issuing tickets, for example railway tickets. The terminal includes a display which the operator manipulates until a replica of the data for a ticket required is obtained. If a sale is made, the operator presses a print button whereupon the terminal prints the required ticket and records the sale. Before the operator leaves the railway station, the Station Master checks the cash collected by the operator against the total of the sales recorded. As the operator cannot print a ticket without recording the monetary value of the sale, undetected fraud by the operator is difficult.

Such a system may include a data store and a facility to write a program into the memory from external source which for example, may be for diagnostic purposes.

The object of the present invention is to provide a system in which fraud by the use of an unauthorized program is made difficult.

According to the present invention, a method of protecting a data processing system against unauthorized programs, the system having a data processor controlling one or more output units capable of issuing value documents or restricted information under the control of output instructions or authorized programs, comprises providing a secure storage area for said output instructions, providing a free storage area into which an operator may load programs, checking that an output instruction has originated in the secure storage area and stopping the implementation of an output instruction which has not originated in the secure storage area.

According to another aspect, the present invention provides a data processing system having protection against unauthorized programs comprises a data processor controlling one or more output units operable to issue value documents or restricted information under the control of output instructions of authorized programs, data storage including a secure storage area containing said output instructions and security logic to ensure that issue of said value documents or restricted information occurs only in response to output instructions from the secure store.

By value document is meant, a document which has an inherent value. This may be printed and issued by the output unit for documents such as railway tickets, airline tickets or insurance certificates, or in the case of bank notes just issued.

By restricted information is meant information to which an unauthorized user should not have access.

In order that the invention may be more readily understood, reference will now be made, by way of example, to the accompanying drawings in which, FIG. 1 is a block diagram of a system embodying the present invention.

In this specification, wherever possible, the same numeral denotes like units in each diagram.

Figure 1:
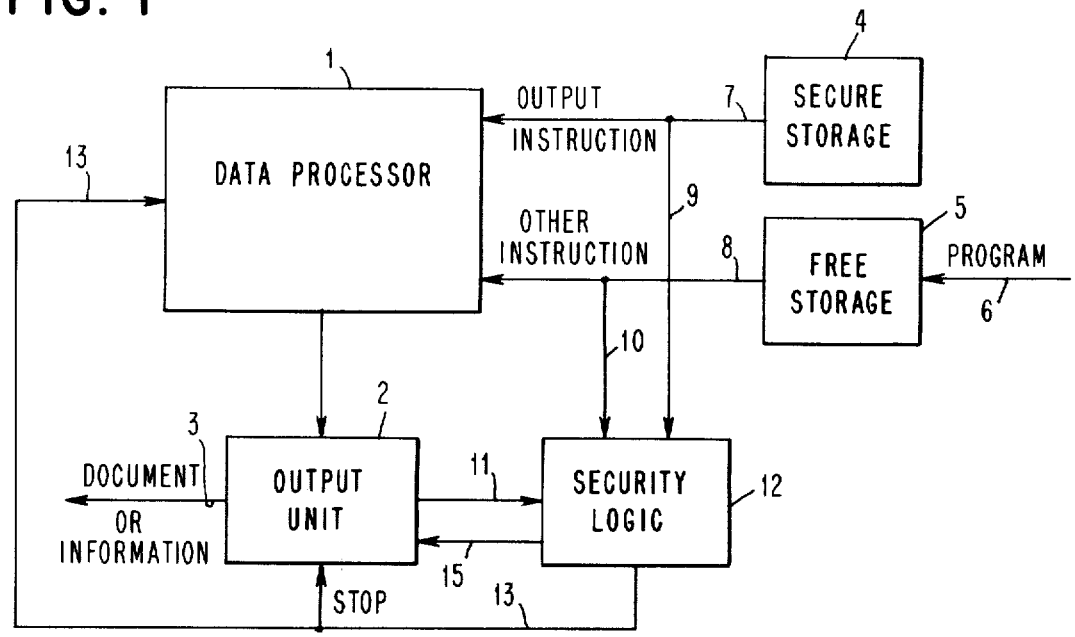

Referring now to FIG. 1 which is a block diagram of a data processing system embodying the present invention. FIG. 1 shows a data processor 1 which controls an output unit 2 capable of issuing a value document or restricted information as indicated generally by arrow 3. When the value document is, for example, a railway ticket or an airline ticket, the ticket may be printed by output unit 2. On the other hand, where the value document is a bank-note, output unit 2 will issue the bank-note from a stack of bank-notes held in output unit 2.

Associated with data processor 1 is a storage area for instructions and data. The storage area is shown as two separate stores called secure storage 4 and free storage 5. Secure storage 4 contains the output instructions which when implemented perform an output operation to produce a value document or restricted information 3. This secure storage 4 is arranged to make tampering with the output instructions difficult. For example, secure storage 4 is preferably a read only store (ROS) in which the output instructions are fixed during manufacture. As this secure storage 4 is preferably a factory characterized semiconductor store, tampering with the output instruction is difficult and replacement is made difficult by keeping the unit containing secure storage 4 locked.

Secure storage 4 may be a read/write store but in this case, special precautions must be taken to ensure that an unauthorized person cannot alter the output instructions. This may take the form of a secret identification code which must be fed into data processor 1 before a write access to secure storage 4. Such secure read/write stores are known in the data processing art.

Free storage 5 is a read/write store, which may contain programs or data normally required by data processor 1, into which an operator may load a program from a cassette on line 6. This facility is required to enable diagnostic routines to be loaded by a customer engineer for the purpose of testing the system, as it would be uneconomic to store these diagnostic routines continuously.

Data bus 7 carries output instructions from secure storage 4 to data processor 1 in response to addresses supplied to the secure storage from processor 1. A signal is generated on line 9 indicating the presence of an output instruction. Similarly, data bus 8 carries other instructions or data from free storage 5 to data processor 1 in response to addresses supplied to the free storage from processor 1. A signal is generated on line 10 indicating the presence of an instruction from free storage 5 which might be an unauthorized output instruction.

Output unit 2 generates a signal on line 11 indicating output unit 2 active, i.e. is processing output instructions. Lines 9, 10 and 11 terminate in security logic 12 which is arranged to respond to the signals on these lines and produce a stop signal on line 13 when signals are present on lines 10 and 11 indicating that an unauthorized output instruction from free storage 5 is being processed by output unit 2. As this combination of signals could mean that a person attempting fraud had loaded a fraudulent program into free storage 5 via line 6 and was attempting to obtain a value document from output unit 2 in a fraudulent manner, the stop signal on line 13 inhibits the operation of output unit 2 and thus prevents the issuing of a value document. The signal on line 13 can also be used to produce an alarm at the data processor 1 and at any other desired location. The other circumstances which could produce a stop signal are machine errors generating erroneous signals on lines 9, 10 and 11.

Security logic 12 also produces a security valid signal when signals are present on lines 9 and 11 indicating that an output instruction from secure storage 4 is being processed which is the permitted mode of operation. The security valid signal may be used to produce a visual indication of correct operation and display at a location remote from data processor 1, or as a positive enable signal for the output unit 2.

When the system is used to control access to restricted information, the system will not allow an unauthorized operator to obtain the restricted information from output unit 2. The addition of security logic 12 will make it difficult for a person attempting fraud to feed a fraudulent program into free storage 5 for the purpose of obtaining the information by attempting to bypass the normal security checks applied to an authorized user. If the person attempting fraud attempts to use an instruction on line 8 as an output instruction, output unit 2 will be stopped by a signal on line 13 and an alarm will be raised. The security logic described so far responds to inhibit issue of a value document or the like by an output unit in response to anything other than an output instruction from the secure storage area. Although the test in the embodiment described above is made using actual output instructions from the storage areas, the test could equally well be made using the storage address signals supplied to the storage areas from the processor 1. This in fact is the technique used in a later embodiment in which the secure and free storage areas share a common input/output bus.

Data processor 1 may control more than one output unit similar to output unit 2. In this case, each additional output unit will require its own security logic 12, though in some cases this may be shared.

In some systems such as, for example, a ticketing system, it is a requirement of the system that when a value document is issued, a permanent record is kept of the case value of the transactions so that when desired the total cash value can be checked against the cash collected.

Thus, if a person attempting fraud could tamper with the instructions controlling the recording of the cash value, he might attempt to operate the system after having fed a fraudulent program into free storage 5 with the object of inhibiting the recording of the cash value, for the purpose of obtaining value documents without an associated record of their issue. This may be made more difficult by storing the instructions controlling recording the cash value in secure storage 4 and generating a signal on line 11 indicating output unit 2 is active when processing instructions to record cash values. Thus, this method of fraud would be detected by security logic 12, output unit 2 stopped and an alarm generated as described earlier.

Figure 2:
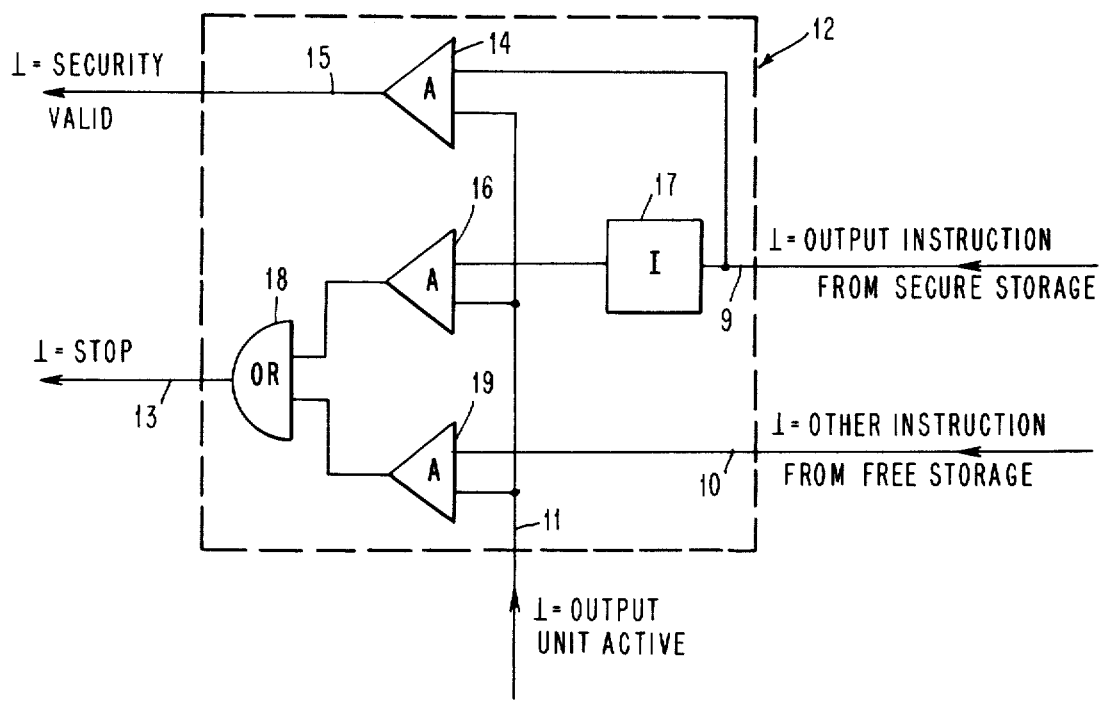
FIG. 2 shows a security logic block of FIG. 1 in more detail.

FIG. 2 shows security logic 12 of FIG. 1 in more detail and uses the same numerals as FIG. 1 to denote input and output lines. AND gate 14 receives inputs on line 9 where a "1" denotes that an output instruction from secure storage is present and on line 11 where a "1" denotes that output unit 2 is active. Thus, a "1" output on line 15 denotes a security valid signal that the system is operating in its intended mode.

AND gate 16 receives an output instruction present signal from line 9, inverted by Invert 17 and an output 2 unit active signal on line 11 and via OR gate 18 can produce a stop signal on line 13. AND gate 19 receives another instruction from free storage present signal on line 10 and an output unit active signal on line 11 via OR gate 18 can produce a stop signal. Thus, a stop signal will be a "1" in the event of output unit 2 being active whilst an output instruction present signal is absent or another instruction present signal is present or both, which indicated the system is operating in a non-intended mode which might be due to a person attempting fraud.

Figure 3:
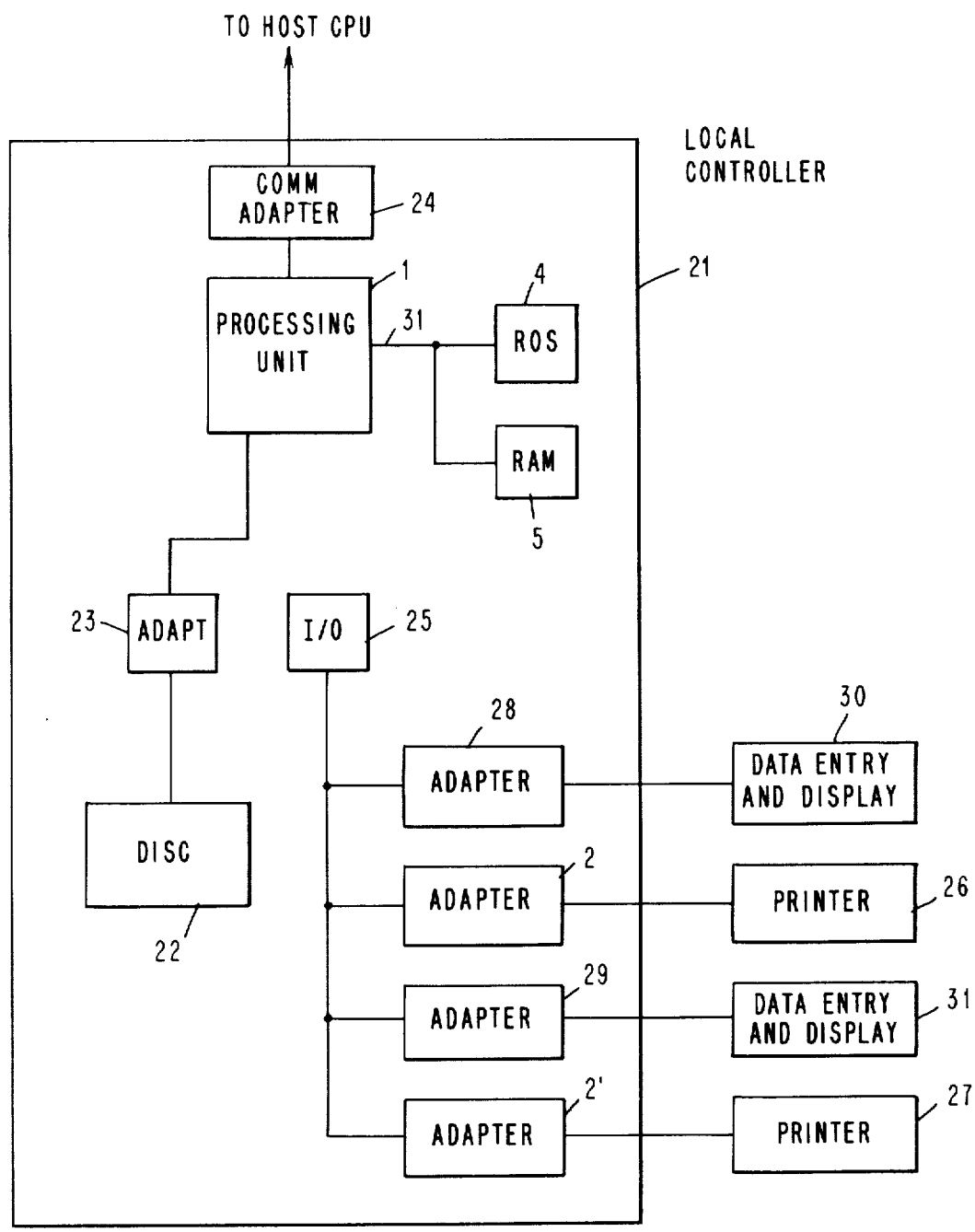
FIG. 3 is a block diagram of a prior art ticketing system.

FIG. 3 is a block diagram of a ticketing system in which the present invention may be used. This diagram is reproduced from FIG. 2 of U.K. Pat. No. 1,437,883 but numerals have been changed to be consistent with the present specification. Reference should be made to the above prior art specification for full details of the ticketing system. Here only a brief description of the ticketing system will be given.

The ticketing system comprises a host central processing unit connected to a number of local controllers 21, each connected to one or more booking office terminals. The system uses logical menu pages which are stored at the host CPU and can be distributed to, and copied at, the local controllers. The logical menu pages include item control words which can be selected in sequence to build up ticket data. Each booking office clerk can produce a ticket by means of a simple selection procedure from data presented to him on a display. In addition, the clerk can directly select some ticketing data from local subsets of logical menu pages without going through the normal selection procedures. Thus, each clerk has to hand all of the data required for any tickets in the railway system and in addition has the provision for very rapidly producing the tickets most often required by passengers at his station.

FIG. 3 shows a local controller 21 together with two booking office terminals. A processing unit 1 is connected to read only control store (secure storage) 4 and random access memory, read/write (free storage) 5. A disc file 23 is connected to the processor 1 through an adapter 23 and a communications adapter 24 is provided for communications between processing unit 1 and the host CPU. An input output multiplexor 25 couples processing unit 1 to two printer adapters 2 and 2' connected to printers 26 and 27 respectively and to two device adapters 28, 29 connected to data entry and display units 30 and 31 respectively. It should be noted that devices 26, 27, 30 and 31 are relatively simple devices, including power supplies, and connection circuits required for printing, and the data entry and display devices including only decoding and drive circuits for the display device itself together with simple coding arrangements for the entry keys. The essential data organization for these devices is accomplished by adapters 2, 2', 28 and 29. In operation, processing unit 2 responds to input data from a data entry unit and, under the control of program instructions in read-only store 4 and memory 5, selects pages of data held in memory 5 for transmittal to the data entry and display devices and, when required, to the printers. If the required data is not held in memory 5, then the processing unit generates a page request to the host processing system through communications adapter 24, and it organizes the storage of data received from the host in memory 5 either for immediate or future use by the controller. Disc unit 22 is used to hold different types of data. Firstly, it can hold statistical data, for example, records of the last 100 tickets sold, daily totals of receipts, totals of tickets of different classes, etc., and this data can be used by the local controller to perform accounting operations using this disc file as a journal. Secondly, it can contain re-start procedures for the local controller, and lastly it can act as an intermediate file for data pages received from the host, thereby extending the number of pages which can be retained at the local controller. Processing unit 1 is operable to organize this data storage, to calculate the required subtotals and to transmit required data, either upon request or at predetermined times, to the host processor.

The arrangement shown in FIG. 1 requires separate lines from secure storage 4 and free storage 5 to data processor 1. In the system shown in FIG. 3, the read only store 4 and random access memory 5 are connected to processing unit 1 by a common input/output bus 31 as has already briefly been mentioned and so the arrangement shown in FIG. 1 cannot be used.

Figure 4:
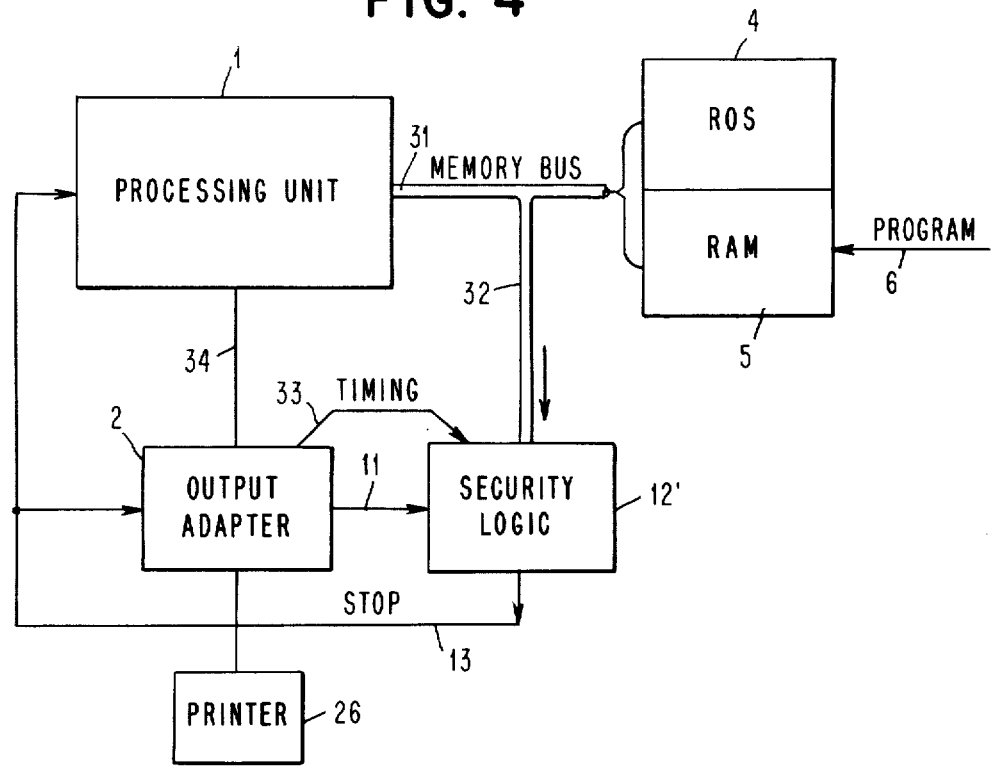
FIG. 4 is a block diagram illustrating the use of the present invention in the ticketing system of FIG. 3.

In FIG. 4, storage for the processing unit 1 is formed by secure storage read only store (ROS) 4 and free storage random access memory (RAM) 5 which share common input/output bus 31. Both ROS 4 and RAM 5 are semiconductor memories, but ROS 4 is programmed during manufacture by deposited wiring to provide a fixed store as is known in the semi-conductor memory art. As a result, ROS 4 is difficult to alter by a person attempting fraud.

In this ticketing system, the programs which control the issue of tickets (value documents) are written into ROS 4 during manufacture. This means that when any tickets are issued by the system, the process is controlled by a program which cannot be altered without difficulty by a person who is attempting to defraud the system by issuing tickets without going through the associated accounting routine resulting in a permanent record of the transactions on disc 22.

The amount of storage that can be attached to a processor is usually limited by cost. Therefore any programs which are needed only rarely (such as diagnositic programs) cannot be included in the ROS 4. To enable these programs to be used there has to be some mechanism which will allow programs of this sort to be loaded into read/write RAM 5 memory. If programs are allowed to be loaded in read/write RAM 5, then the contents of these programs cannot be guaranteed at manufacture time in the same way as those in read only storage 4. These programs could conceivably be used to control the system in such a way as to defraud it of tickets.

In the ticketing system of FIG. 3, the facility is provided for a customer engineer to plug a cassette with an adapter into processing unit 1, which transfers diagnostics stored in the cassette to read/write storage 5.

To prevent a program fed into read/write store 5 schematically shown by line 6 in FIG. 4, security logic 12' is provided. Security logic 12' has three inputs, an extension 32 of memory bus 31, an output adapter 2, active signal on line 11, and a timing signal from output adapter 2. Security logic 12 uses these inputs to check that an output instruction has originated in the secure storage ROS 4. In the event of the conditions being detected that an instruction from the free storage RAM 5 is causing operation of adapter 2, a STOP signal is generated on line 13 which prevents operation of printer 26 under the control of output adapter 2 and resets processing unit 1. Thus, under these conditions a ticket which would be fraudulent could not be printed.

The operation of security logic 12' will now be explained in more detail.

In the ticketing system there is a cycle of hardware steps which are to execute any instructions. They are as follows:

(a) Fetch the instruction from storage.
(b) Interpret the instruction to decide what to do.
(c) Find the address of the next instruction.
(d) Perform the operations called for by the instruction.

In order to speed up the operation of the processor 1 the operation of sequential steps is overlapped. The timing for such an operation is as follows:

| SIGNAL NAME | INTERPRETATION OF INPUT/OUTPUT OF PROCESSING UNIT 1 | | | | NEXT INSTRUCTION CYCLE |
|---|---|---|---|---|---|
| | TIME | | | | |
| Memory Address bus 31 Contents | | Address of Data | | Address of Next Instruction | |
| Input/Output bus 34 Contents | | Adapter Address | Command Code | Data | |
| Function Being Performed | Interpret Instruction | Send Address to Select I/O Adapter 2 | Send Command to I/O Device | Send Data to I/O Adapter and Fetch Next Instruction | Interpret Next Instruction |

Now as the address of the next instruction after an output instruction for the issue of a value document and the like is always the next sequential instruction (i.e. the output instruction does not branch), the address of the next instruction must be in the same part of storage as the previous output instruction. This is due to the fact that instructions are stored sequentially in secure store ROS 4.

Security logic tests to see if the memory address of the next instruction supplied from processing unit 1 over bus 31 is within a valid range of addresses to cause output adapters 2 of 2′ to issue value documents. If the address is not within the predetermined range, then the operation requested is not performed, and a stop signal is generated.

The valid range of storage addresses can be either set at manufacture time, or could be loaded into a register by an initial program load instruction executed from within the previously valid range at power on initialization.

Figure 5:
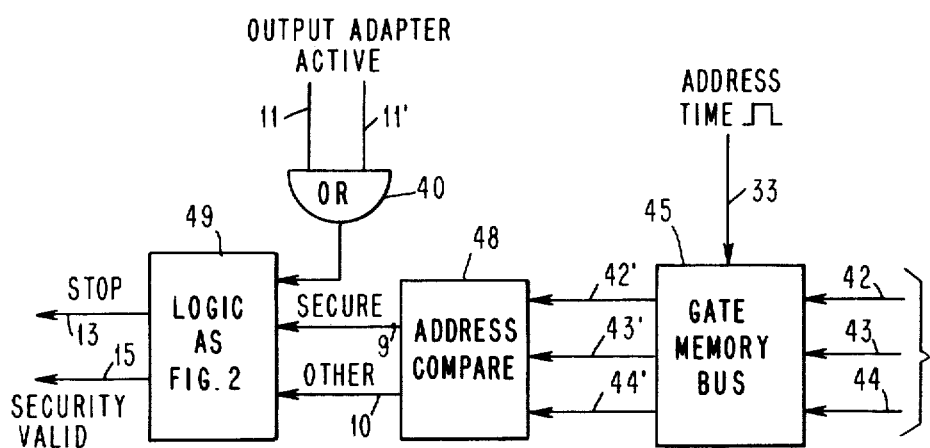
FIG. 5 shows the security logic block of FIG. 4 in more detail.

FIG. 5 shows the security logic 12′ of FIG. 4 in more detail. In FIG. 3, two adapters are shown which can produce tickets and thus two lines 11 and 11′ and OR gate 40 are required. In the ticketing system, the total storage requires eight modules and thus the bus line 32 (FIG. 4) requires three lines 42, 43 and 44 (FIG. 4) for address purposes. Read only store ROS 4 and read write store RAM 5 are each a whole number of modules.

Address compare circuit 48 contains sufficient logic to test whether or not addresses supplied oer input/output bus 31 and supplied over lines 42, 43 and 44 are to secure store ROS 4 or free store RAM 5. In order to perform the test, the address signals on these lines are gated through gate memory bus 45 at address time by an address time signal on line 33 from output adapter 2 (2′). The addresses are supplied thereafter to compare circuit 48 over lines 42′, 43′ and 44′. If the address bits are within the address range of the secure read only store 4, an output signal is generated on line 9 indicating that an output instruction is being fetched from secure storage which will cause the associated output adapter to issue a value document or the like. If the address bits are within the address range of read/write store RAM 5, an output signal is generated on line 10 indicating that instruction is being fetched from free storage which must not result in a value document being issued.

Lines 9 and 10 are inputs to logic block 49. A third input line to block 49 is line 11 or 11′ indicating output adapter 2 or 2′ active due to an output instruction having been received by output adapter 2 or 2′. As explained earlier, the output adapter active signal on line 11 or 11′ is checked against the next sequential address as selected by the address time pulse on line 33. Thus, the inputs to block 49 perform the same function as the inputs shown for the logic illustrated in FIG. 2, and the same logic is used to produce the same outputs namely, a stop signal on line 13 and a security check signal on line 15.

In the system of FIG. 3, security logic 12′ is also associated with output adapter 2′, the only difference being that the output active signal is provided by line 11′ instead of line 11 as explained above.

Provision for a customer engineer to test printers 26 and 27 in FIG. 3 is made by including a restricted number of diagnostic output instructions in secure storage ROS 4. This diagnostic output instructions enable a ticket to be printed with a special test pattern. The customer engineer calls up these instructions by inserting a diagnostic program in read/write storage RAM 5. Non-printing diagnostic instructions are stored in read/write storage RAM 5.

What is claimed is:

1. A method of protecting value documents and restricted information controlled by a data processing system against unauthorized issuance from an output unit operated by the system, comprising providing a special storage area which cannot be modified by a system user for storing output instructions which may be executed by the system to actuate the output unit to issue a value document, providing another storage area into which an operator may load programs and data, detecting whether a current instruction provided for system execution is an output instruction, sensing if each output instruction detected by the detecting step originated in the special storage area, permitting the output unit to be actuated by the output instruction when the sensing step senses origination of the current instruction from the special storage area, and stopping the output unit from issuing any value document under control of the output instruction when the sensing step senses the output instruction did not originate in the special storage area.

2. A method as claimed in claim 1, further comprising providing said special storage area as a read only store.

3. In a data processing system operating an output unit for issuing value documents, means for preventing the issuance of value documents from the output unit by execution of output instructions from an unauthorized source, comprising
   a special storage area which cannot be modified by a system user being an authorized source for output instructions,
   means for detecting when the current instruction being executed by the data processing system is an output instruction for actuating the output unit to issue a value document and providing an output instruction signal,
   sensing means for indicating whether or not the current instruction was accessed in the special storage area and providing an authorization signal,
   means for stopping the output unit from issuing the value document in response to no authorization signal being provided from the sensing means while the detecting means is providing an output instruction signal,
   whereby the stopping means indicates when the output instruction did not derive from the special storage area and prohibits issuance of the value document.

4. A system as claimed in claim 3, in which a security-protected area in a system main storage comprises the special storage area.

5. A system as claimed in claim 3, further comprising
   AND gate means having one input connected to the detecting means to receive output instruction signals and having another input connected to the sensing means to receive inverted authorization signals indicating no authorization, an output of the AND gate means connected to an inhibit input of the output unit to control issuance of value documents by the output unit,
   whereby the AND gate means provides the stopping means.

6. A system as claimed in claim 5, further comprising
   means for indicating whether the current instruction for the system was accessed from another source of instructions other than the special storage area and providing an unauthorized signal,
   a second AND gate means having one input connected to the indicating means to receive the unauthorized signals and having another input connected to the detecting means to receive output instruction signals, OR circuit means connecting the outputs of both AND gate means to the inhibit input of the output unit to control issuance of value documents, whereby only output instructions obtained from the special storage area can cause the output unit to issue any value document.

* * * * *